United States Patent
Klesyk et al.

(10) Patent No.: US 9,130,471 B2
(45) Date of Patent: Sep. 8, 2015

(54) CONVERTER WITH TRANSFORMER FLUX WALK PROTECTION CONTROLLER

(71) Applicant: Lear Corporation, Southfield, MI (US)

(72) Inventors: Krzysztof Klesyk, Novi, MI (US); George Kaminski, Livonia, MI (US)

(73) Assignee: Lear Corporation, Southfield, MI (US)

( * ) Notice: Subject to any disclaimer, the term of this patent is extended or adjusted under 35 U.S.C. 154(b) by 263 days.

(21) Appl. No.: 13/959,191

(22) Filed: Aug. 5, 2013

(65) Prior Publication Data

US 2015/0036396 A1    Feb. 5, 2015

(51) Int. Cl.
*H02M 3/335* (2006.01)
*H02M 3/337* (2006.01)
*H02M 1/14* (2006.01)

(52) U.S. Cl.
CPC .............. *H02M 3/337* (2013.01); *H02M 1/14* (2013.01)

(58) Field of Classification Search
USPC ............ 363/15–16, 17, 22–26, 55–56.11, 97, 363/98, 133–134
See application file for complete search history.

(56) References Cited

U.S. PATENT DOCUMENTS

| | | | |
|---|---|---|---|
| 4,233,658 A * | 11/1980 | Lupatin et al. | 363/26 |
| 4,477,867 A | 10/1984 | Pellegrino | |
| 4,542,440 A | 9/1985 | Chetty et al. | |
| 4,809,148 A | 2/1989 | Barn | |
| 4,849,874 A | 7/1989 | Buck et al. | |
| 5,815,381 A | 9/1998 | Newlin | |
| 7,616,460 B2 | 11/2009 | Huang | |
| 7,813,148 B2 | 10/2010 | Zeng et al. | |
| 2005/0135121 A1 * | 6/2005 | Hamilton | 363/22 |
| 2012/0294428 A1 | 11/2012 | Oketa et al. | |
| 2013/0033908 A1 | 2/2013 | Schwarz et al. | |

FOREIGN PATENT DOCUMENTS

DE    102011084006 A1    4/2013

\* cited by examiner

*Primary Examiner* — Nguyen Tran
(74) *Attorney, Agent, or Firm* — Brooks Kushman P.C.

(57) ABSTRACT

An assembly includes a converter and a controller. The converter has a winding around a transformer core, first and second switches configured to alternately connect respective winding segments to an input power, and first and second resistors respectively connected in series with the switches. The controller is configured to compare voltages corresponding to currents through the resistors and terminate operation of the converter when a difference between the voltages exceeds a threshold indicative of transformer core flux walking.

14 Claims, 4 Drawing Sheets

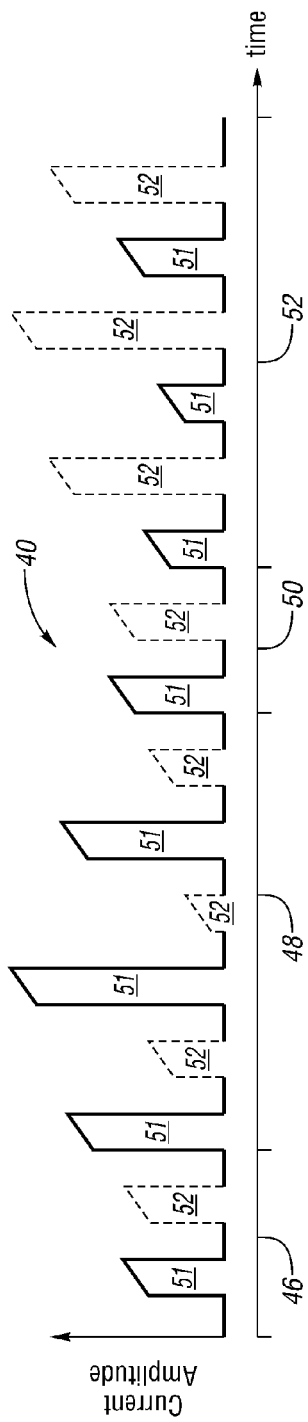
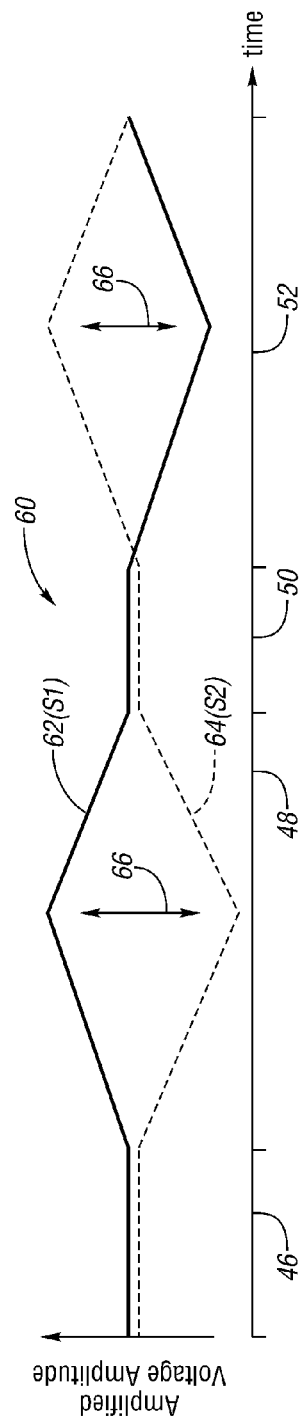
FIG. 2A
FIG. 2B

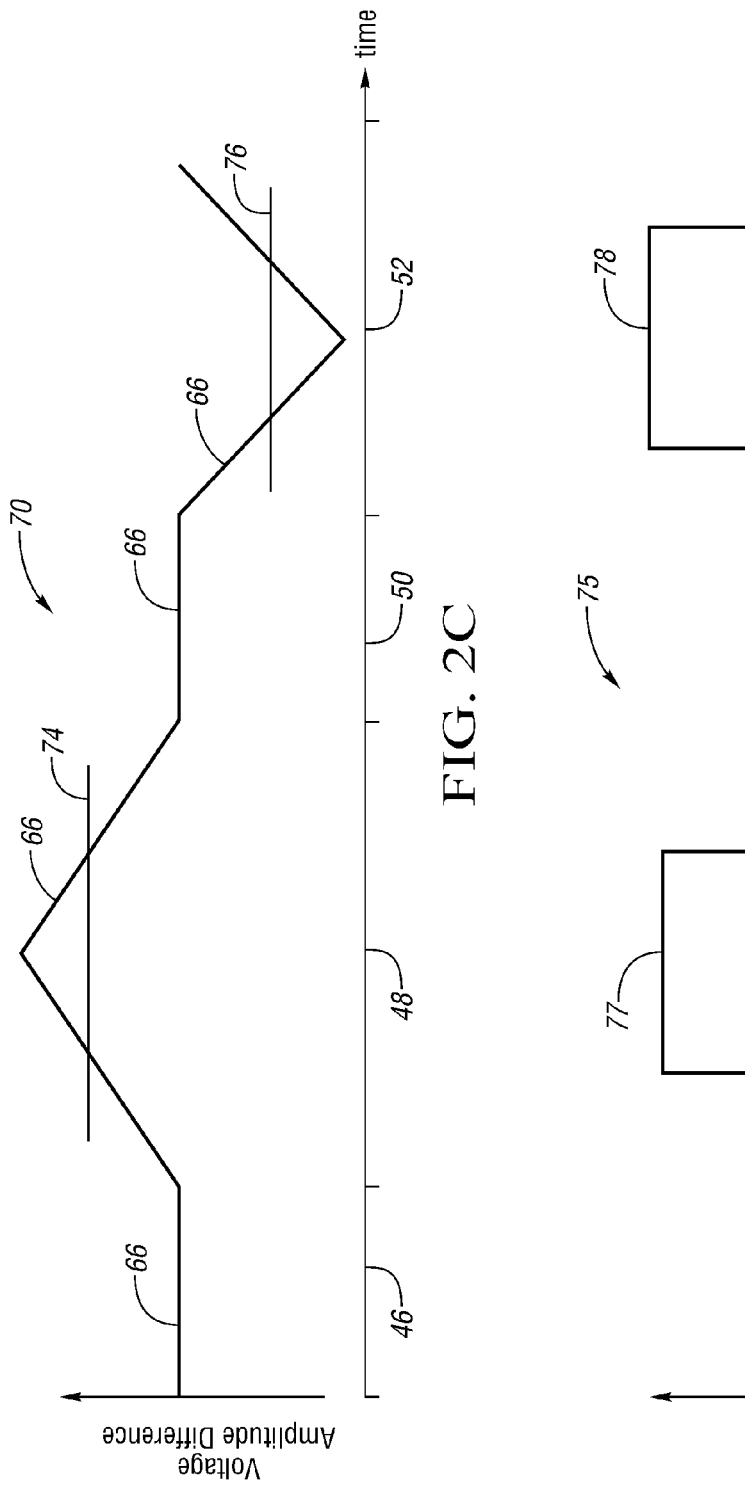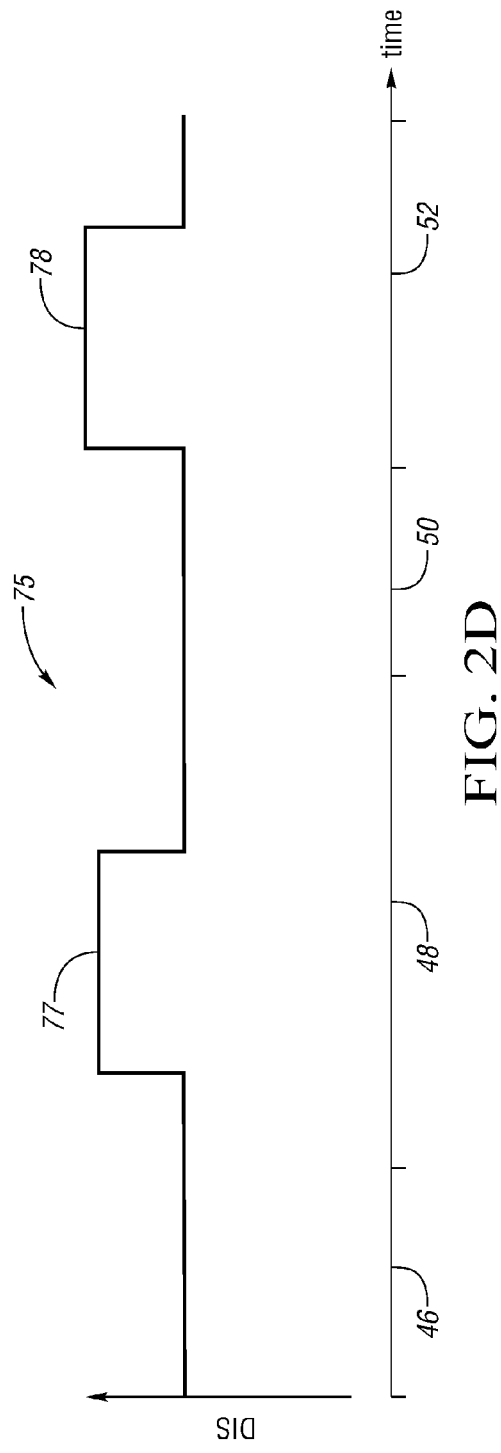

CONVERTER WITH TRANSFORMER FLUX WALK PROTECTION CONTROLLER

TECHNICAL FIELD

The present invention generally relates to push-pull converters.

BACKGROUND

A push-pull DC/DC converter converts an input DC voltage into an output DC voltage. The converter includes a transformer having a primary winding and a secondary winding. The windings are both wound around a common magnetic core. First and second switches alternately connect respective primary winding segments with a DC input source. The switches operate in opposite phase and conduct current through the corresponding primary winding segments during alternative half cycles. The output of the converter is regulated using duty control of the switches. The primary winding transfers energy to the secondary winding, which develops an alternating output that is rectified and filtered to provide a DC output.

Such a push-pull converter uses the magnetic core (i.e., the transformer core) over its entire magnetization curve, producing flux in the core having both positive and negative values. An issue is that the core may "walk" into saturation. Saturation of the core results from a net DC voltage being applied to the primary winding due to a net difference in the volt-second product of each half-cycle. This difference is typically caused by asymmetry in the operation of the switches due to delays in the various steps of amplification in the converter.

Open loop, push-pull DC/DC converters are susceptible to transformer core flux walk due to volt-second mismatch on the primary side of the converter. Once flux walking occurs the core saturates, which may cause increased primary currents, increased ringing and noise, damaged output diode rectifiers, and/or damaged switches.

SUMMARY

An object of the present invention includes flux walk protection for a converter such as a push-pull converter.

Another object of the present invention includes flux walk protection for a converter such as an open-loop, push-pull DC/DC converter.

In carrying out one or more of the above and other objects, the present invention provides an assembly including a converter and a controller. The converter has a winding around a transformer core, first and second switches configured to alternately connect respective winding segments to an input power, and first and second resistors respectively connected in series with the switches. The controller is configured to compare voltages corresponding to currents through the resistors and terminate operation of the converter when a difference between the voltages exceeds a threshold indicative of transformer core flux walking.

Further, in carrying out one or more of the above and other objects, the present invention provides a method for use with a converter having a winding around a transformer core, first and second switches configured to alternately connect respective winding segments to an input power, and first and second resistors respectively connected in series with the switches. The method includes comparing voltages corresponding to currents through the resistors and terminating operation of the converter when a difference between the voltages exceeds a threshold indicative of transformer core flux walking.

Also, in carrying out one or more of the above and other objects, the present invention provides an assembly including a converter and a controller. The converter has a winding around a transformer core, first and second switches configured to alternately connect respective winding segments to an input power, and first and second resistors respectively connected in series with the switches. The controller includes a first current sense amplifier configured to receive and amplify a voltage corresponding to current through the first resistor and a second current sense amplifier configured to receive and amplify a voltage corresponding to current through the second resistor. The controller further includes an amplifier comparator configured to receive the voltages from the first and second sense amplifiers, compare the voltages, and generate an output indicative of a difference between the voltages. The controller is further configured to terminate operation of the converter when the difference between the voltages exceeds a threshold indicative of transformer core flux walking.

BRIEF DESCRIPTION OF THE DRAWINGS

FIG. 2A illustrates a diagram of current waveforms for the switches of the converter versus time during operation of the converter;

FIG. 2B illustrates a diagram of amplified voltage waveforms corresponding to the current waveforms for the switches of the converter versus time during operation of the converter;

FIG. 2C illustrates a diagram of the difference between the amplified voltage waveforms for the switches of the converter versus time during operation of the converter;

FIG. 2D illustrates a diagram of a converter reset being enabled when the difference between the amplified voltage waveforms for the switches of the converter exceeds a high threshold or deceeds a low threshold during operation of the converter;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
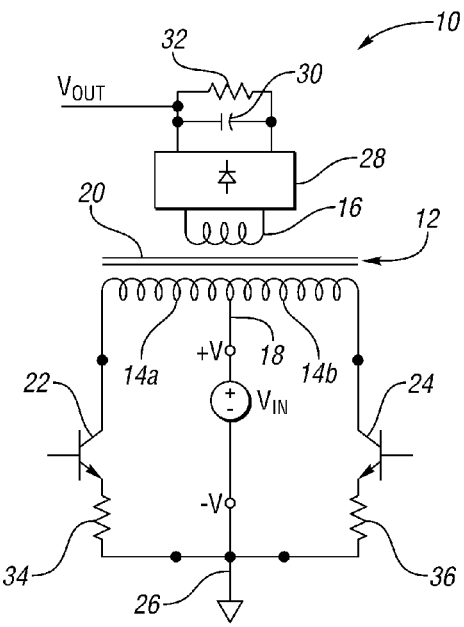
FIG. 1 illustrates a schematic diagram of a converter for use with a transformer flux walk protection controller in accordance with embodiments of the present invention.

Referring now to FIG. 1, a schematic diagram of a converter 10 for use with a transformer flux walk protection controller (not shown) in accordance with embodiments of the present invention is shown. Converter 10 is an open loop, push-pull DC/DC converter configured to convert an unregulated input DC voltage (i.e., an input power) into an output DC voltage. Converter 10 includes a transformer 12 having a primary winding 14 and a secondary winding 16. Primary winding 14 is center-tapped and includes first and second primary winding segments 14a, 14b joined at a center tap 18. Primary winding 14 and secondary winding 16 are both wound around a common transformer core (i.e., magnetic core) 20 of transformer 12 and are magnetically coupled.

Primary winding 14 is on the primary or input side of converter 10 and secondary winding 16 is on the secondary or output side of the converter. Further on the input side, converter 10 includes a first switch 22 (i.e., a first transistor) and a second switch 24 (i.e., a second transistor). Switches 22, 24 alternately connect primary winding segments 14a, 14b with a DC input Vin. The DC input Vin has its positive terminal +V connected with center tap 18 and its negative terminal −V connected with ground (or a reference) 26. Switches 22, 24 are shown as transistors having their collector-emitter circuits connected from the terminals of corresponding primary winding segments 14a, 14b toward ground 26.

On the output side, converter 10 includes a rectifier assembly 28 connected across secondary winding 16. Rectifier assembly 28 rectifies the output from secondary winding 16 to produce a DC output voltage. A filter capacitor 30 is configured to filter the DC output voltage and thereby supply a DC output Vout to a load 32.

Converter 10 further includes first and second resistors 34, 36 respectively associated with first and second switches 22, 24. First resistor 34 is connected in series with first switch 22 between first switch 22 and ground 26 and is provided for measuring the current through first switch 22. Similarly, second resistor 36 is connected in series with second switch 24 between second switch 24 and ground 26 and is provided for measuring the current through second switch 24.

Referring now to FIG. 2A, with continual reference to FIG. 1, a diagram 40 of current waveforms 42, 44 for first and second switches 22, 24 of converter 10 versus time during operation of the converter is shown. In FIG. 2A, "S1" refers to first switch 22 and "S2" refers to second switch 24. Switch current 42 of first switch 22 is sensed by measuring the voltage across first resistor 34 and switch current 44 of second switch 24 is sensed by measuring the voltage across second resistor 36.

As indicated above, during operation of converter 10, switches 22, 24 operate in opposite phase and alternately connect respective primary winding segments 14a, 14b with DC input Vin such that the switches conduct current through corresponding primary winding segments 14a, 14b during alternative half cycles. As further indicated above, open loop, push-pull DC/DC converters such as converter 10 are susceptible to transformer core flux walking due to volt-second mismatch of at least some of the half-cycles.

As shown in diagram 40, switch currents 42, 44 for first and second switches 22, 24 are of the same character having a series of ramps made up of the transformer magnetizing current and the load current reflected in the primary winding. As the primary winding is center-tapped and as switches 22, 24 conduct current through the corresponding primary winding segments during alternative half cycles, the power resulting from switch currents 42, 44 is fixed. As such, when switch current 42 of first switch 22 decreases, for instance due to asymmetric operation of the switches (i.e., volt-second mismatch is present), switch current 44 of second switch 24 increases proportionally. Conversely, when switch current 44 of second switch 24 decreases, for instance again due to asymmetric operation of the switches, switch current 42 of first switch 22 increases proportionally. On the other hand, switch currents 42, 44 of switches 22, 24 are the same when the operation of the switches is symmetric (i.e., volt-second mismatch is absent).

Switches 22, 24 have symmetric operation during time periods 46 and 50 shown in diagram 40 as switch currents 42, 44 of switches 22, 24 are the same during time periods 46 and 50. Switches 22, 24 have asymmetric operation during time period 48 as switch current 42 of first switch 22 is increased relative to switch current 44 of second switch 24 during time period 48 as shown in diagram 40. Likewise, switches 22, 24 have asymmetric operation during time period 52 as switch current 44 of second switch 24 is increased relative to switch current 42 of first switch 22 during time period 52 as shown in diagram 40.

Referring now to FIG. 2B, with continual reference to FIG. 2A, a diagram 60 of amplified voltage waveforms 62, 64 corresponding to switch currents 42, 44 for switches 22, 24 versus time during operation of converter 10 is shown. As shown in FIG. 2B, voltage waveforms 62, 64 have the same given amplitude during time periods 46 and 50 as switch currents 42, 44 are the same during time periods 46 and 50. As further shown in FIG. 2B, during time period 48, voltage waveform 62 for first switch S1 increasingly ramps from the given amplitude, hits a peak, and then decreasingly falls back to the given amplitude whereas voltage waveform 64 for second switch S2 decreasingly falls from the given amplitude, hits a trough point, and then increasingly ramps back to the given amplitude. Voltage waveform 62 has a larger amplitude than voltage waveform 64 at each point during time period 48 as switch current 42 of first switch 22 is increased relative to switch current 44 of second switch 24 during time period 48. Similarly, as further shown in FIG. 2B, during time period 52, voltage waveform 64 for second switch S2 increasingly ramps from the given amplitude, hits a peak, and then decreasingly falls back to the given amplitude whereas voltage waveform 62 for first switch S1 decreasingly falls from the given amplitude, hits a trough point, and then increasingly ramps back to the given amplitude. Voltage waveform 64 has a larger amplitude than voltage waveform 62 at each point during time period 52 as switch current 44 of second switch 24 is increased relative to switch current 42 of first switch 22 during time period 52.

In summary, voltage waveforms 62, 64 for switches 22, 24 have the same amplitude during time periods 46 and 50 as switches 22, 24 have symmetric operation during time periods 46 and 50. Voltage waveform 62 for first switch 22 has a larger amplitude than voltage waveform 64 of second switch 24 during time period 48 as switches 22, 24 have asymmetric operation with switch current 42 of first switch 22 being increased relative to switch current 44 of second switch 24 during time period 48. Likewise, voltage waveform 64 for second switch 24 has a larger amplitude than voltage waveform 62 of first switch 22 during time period 52 as switches 22, 24 have asymmetric operation with switch current 44 of second switch 24 being increased relative to switch current 42 of first switch 22 during time period 52.

Amplitude difference 66 is the difference of voltage waveform 64 subtracted from voltage waveform 62 (i.e., difference 66=voltage waveform 62−voltage waveform 64). Difference 66 between voltage waveforms 62, 64 is indicative of the degree of asymmetric operation between switches 22, 24. Thus, if amplitude difference 66 is too large during time periods 48 or 52, then the operation of switches 22, 24 has to be resolved or else transformer flux walking will occur.

Referring now to FIG. 2C, with continual reference to FIGS. 2A and 2B, a diagram 70 of difference 66 between voltage waveforms 62, 64 for switches 22, 24 versus time during operation of converter 10 is shown. Difference 66 is zero during time periods 46 and 50 as voltage waveforms 62, 64 have the same amplitude during time periods 46 and 50.

Difference 66 has positive values during time period 48 as voltage waveform 62 has larger amplitudes than voltage waveform 64 during time period 48. Conversely, difference 66 has negative values during time period 52 as voltage waveform 64 has larger amplitudes than voltage waveform 62 during time period 52.

Difference 66 may be compared with a high threshold 74 and a low threshold 76. Thresholds 74, 76 are thresholds for transformer flux walking. As such, difference 66 exceeding high threshold 74, such as shown in FIG. 2C during a portion of time period 48, is indicative of the degree of asymmetric operation between switches 22, 24 being such that transformer flux walking may occur unless the operation of the switches is resolved. Thus, whenever difference 66 exceeds high threshold 74, converter 10 can be shut off to avoid transformer flux walking. Correspondingly, difference 66 deceeding low threshold 76, such as shown in FIG. 2C during a portion of time period 52, is indicative of the degree of asymmetric operation between switches 22, 24 being such that transformer flux walking may occur unless the operation of the switches is resolved. Again, whenever difference 72 deceeds low threshold 76, converter 10 can be shut off to avoid transformer flux walking.

Referring now to FIG. 2D, with continual reference to FIG. 2C, a diagram 75 of a converter reset being enabled when difference 66 exceeds high threshold 74 or deceeds low threshold 76 during operation of converter 10 is shown. The converter reset is enabled (i.e., converter 10 is shut off) in order to avoid flux walking. As indicated in FIG. 2D, a converter reset enable pulse 77 is generated while amplitude 66 exceeds high threshold 74. Likewise, a converter reset enable pulse 79 is generated while amplitude 66 deceeds low threshold 76.

Figure 3:
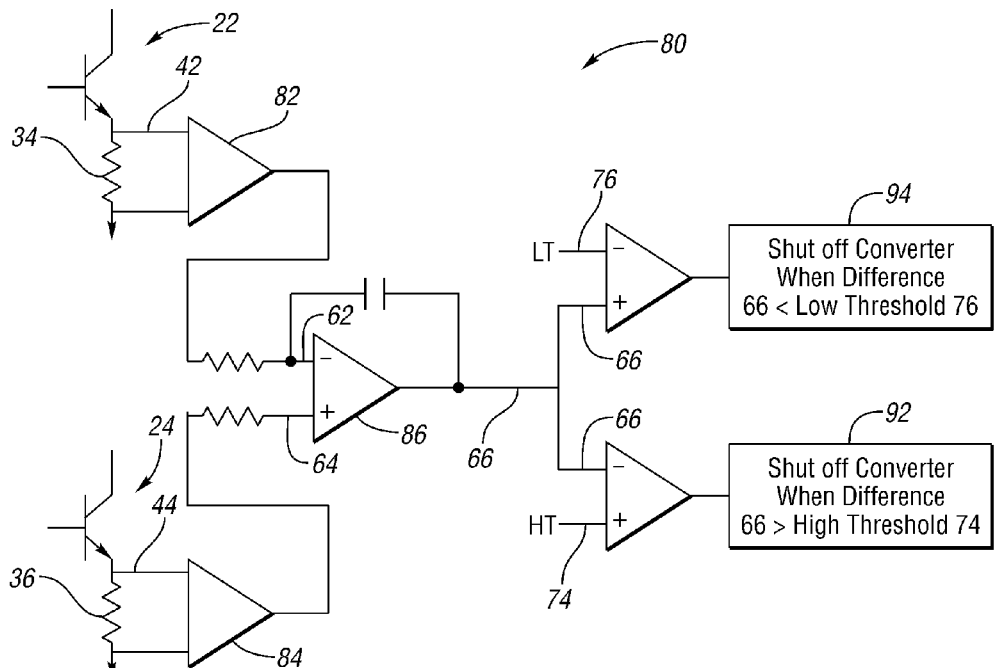
FIG. 3 illustrates a schematic diagram of a transformer flux walk protection controller in accordance with an embodiment of the present invention for use with the converter.

Referring now to FIG. 3, with continual reference to FIGS. 1 and 2A, 2B, and 2C, a schematic diagram of a transformer flux walk protection controller 80 in accordance with an embodiment of the present invention for use with converter 10 is shown. In general, controller 80 is configured to: receive voltage inputs corresponding to switch currents 42, 44 of switches 22, 24 (cf. FIG. 2A); generate amplified voltage waveforms 62, 64 from the voltage inputs (cf. FIG. 2B); generate amplitude difference 66 from voltage waveforms 62, 64 (cf. FIG. 2C); compare difference 66 with high and low thresholds 74, 76 (cf. FIG. 2C); and shut off operation of converter 10 in the event that difference 66 exceeds high threshold 74 or deceeds low threshold 76 (cf. FIG. 2D).

As shown in FIG. 3, controller 80 includes first and second current sense amplifiers 82, 84. Two inputs of first sense amplifier 82 are connected across sense resistor 34 of first switch 22 for first sense amplifier 82 to receive a voltage input corresponding to switch current 42 of first switch 22. As such, first sense amplifier 82 receives a voltage input indicative of switch current 42 of first switch 22 shown in FIG. 2A. First sense amplifier 82 amplifies this voltage input to generate the corresponding amplified voltage waveform 62 shown in FIG. 2B. Similarly, two inputs of second sense amplifier 84 are connected across sense resistor 36 of second switch 24 for second sense amplifier 84 to receive a voltage input corresponding to switch current 44 of second switch 24. As such, second sense amplifier 84 receives a voltage input indicative of switch current 44 of second switch 24 shown in FIG. 2A. Second sense amplifier 84 amplifies this voltage input to generate the corresponding amplified voltage waveform 64 shown in FIG. 2B.

Controller 10 further includes an integrating difference amplifier comparator 86. Two inputs of amplifier comparator 86 receive as voltage inputs voltage waveforms 62, 64. In particular, the "−" inverting input of amplifier comparator 86 receives voltage waveform 62 corresponding to switch current 42 of first switch 22. The "+" non-inverting input of amplifier comparator 86 receives voltage waveform 64 corresponding to switch current 44 of second switch 24. Amplifier comparator 86 generates amplitude difference 66 between voltage waveforms 62, 64 shown in FIG. 2C. As such, amplifier comparator 86 integrates the feedback from first and second sense amplifiers 82, 84 and amplifies any current mismatch between the "−" and "+" inputs to thereby generate amplitude difference 66 shown in FIG. 2C.

Controller 10 further includes a high comparator 88 and a low comparator 90. Both comparators 88, 90 receive amplitude difference 66 output from amplifier comparator 86. High comparator 88 is configured to compare amplitude difference 66 with high threshold 74 shown in FIG. 2C. Low comparator 90 is configured to compare amplitude difference 66 with low threshold 76 shown in FIG. 2C. In the event of amplitude difference 66 exceeding high threshold 74, the operation of converter 10 is shut off in order to avoid transformer core walking as indicated by block 92. Likewise, in the event of amplitude difference 66 deceeding low threshold 76, the operation of converter 10 is shut off in order to avoid transformer core walking as indicated by block 94.

Figure 4:
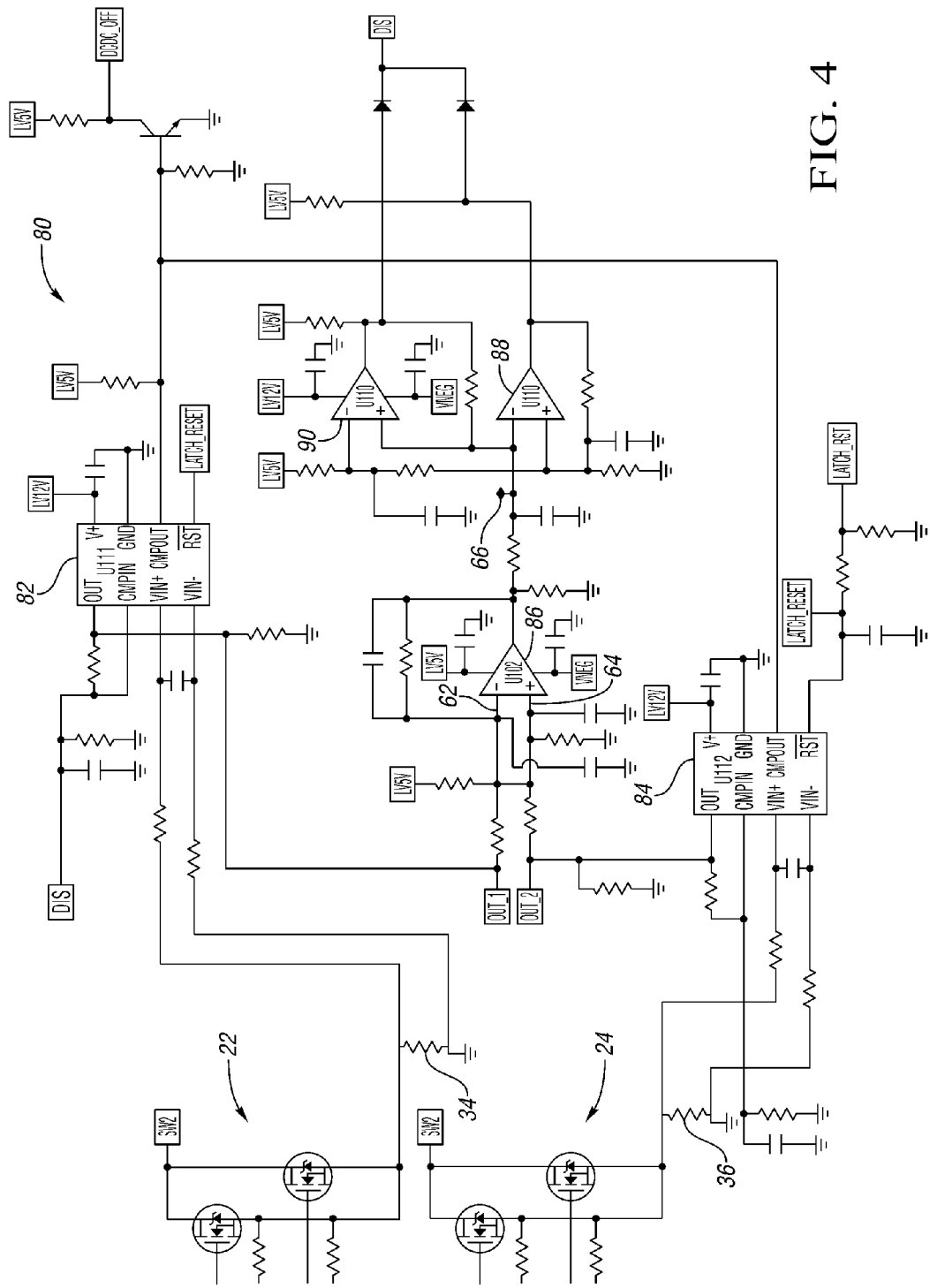
FIG. 4 illustrates a highly-detailed schematic diagram of a transformer flux walk protection controller in accordance with embodiments of the present invention such as the controller shown in FIG. 3.

Referring now to FIG. 4, with continual reference to FIG. 3, a highly-detailed schematic diagram of transformer flux walk protection controller 80 is shown. In FIG. 4, first sense amplifier 82 is a "U111" amplifier, second sense amplifier 84 is a "U112" amplifier, integrating difference amplifier comparator 86 is a "U102" amplifier comparator, and high and low comparators 88, 90 are "U110" comparators. As described, sense amplifiers 82, 84 are used to amplify current flowing thru the corresponding sense resistors 34, 36. Sense amplifiers 82, 84 are also used for peak current protection and fault latching. Amplifier comparator 86 integrates feedback from sense amplifiers 82, 84 and amplifies any current mismatch between these two inputs. Comparators 88, 90 respectively set up high and low thresholds 74, 76 for flux walking. For instance, the magnitude of each of thresholds 74, 76 may be 15 A. Of course, any other threshold or thresholds may be chosen. Furthermore, with respect to blocks 92, 94 of FIG. 3, latches inside sense amplifiers 82, 84 are used to shut off converter 10 when a high or low fault condition is detected. For instance, a converter reset enable pulse 77 is applied to a "DIS" input of a sense amplifier 82, 84 while amplitude difference 66 exceeds high threshold 74 in order to reset converter 10. Likewise, a converter reset enable pulse 79 is applied to the "DIS" input of the sense amplifier while amplitude difference 66 deceeds low threshold 76 in order to reset converter 10. Additionally, the output 66 of amplifier comparator 86 can be fed back to a microcontroller configured to control the switching of switches 22, 24 in order to close the loop and minimize or eliminate flux walking. As described, the flux walk protection of controller 80 allows for protecting from flux walking and allows for flux walk compensation.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An assembly comprising:
a converter having a winding around a transformer core, first and second switches configured to alternately connect respective winding segments to an input power, and first and second resistors respectively connected in series with the switches, the first resistor being connected between the first switch and a circuit reference point and the second resistor being connected between the second switch and the circuit reference point; and
a controller configured to compare a first voltage across the first resistor sensed at a point between (i) the first switch and the first resistor and (ii) the circuit reference point and a second voltage across the second resistor sensed at a point (i) between the second switch and the second resistor and (ii) the circuit reference point and terminate operation of the converter including shutting off the converter when a difference between the voltages either exceeds a high threshold indicative of transformer core flux walking or deceeds a low threshold indicative of transformer core flux walking.

2. The assembly of claim 1 wherein:
the controller includes an amplifier comparator for comparing the voltages and generating an output indicative of the difference between the voltages.

3. The assembly of claim 2 wherein:
the amplifier comparator is an integrating difference amplifier comparator.

4. The assembly of claim 2 wherein:
the controller further includes a comparator assembly configured to compare the output indicative of the difference between the voltages with the thresholds indicative of transformer core flux walking.

5. The assembly of claim 4 wherein:
the comparator assembly includes a high comparator configured to compare the output indicative of the difference between the voltages with the high threshold indicative of transformer core flux walking and a low comparator configured to compare the output indicative of the difference between the voltages with the low threshold indicative of transformer core flux walking.

6. The assembly of claim 5 wherein:
the controller includes a reset assembly configured to terminate operation of the converter, wherein the reset assembly is configured to be triggered to terminate operation of the converter upon the high comparator detecting the difference between the voltages exceeding the high threshold.

7. The assembly of claim 6 wherein:
the reset assembly is further configured to be triggered to terminate operation of the converter upon the low comparator detecting the difference between the voltages deceeding the low threshold.

8. A method for use with a converter having a winding around a transformer core, first and second switches configured to alternately connect respective winding segments to an input power, and first and second resistors respectively connected in series with the switches, the first resistor being connected between the first switch and a circuit reference point and the second resistor being connected between the second switch and the circuit reference point, the method comprising:
comparing a first voltage across the first resistor sensed at a point between (i) the first switch and the first resistor and (ii) the circuit reference point and a second voltage across the second resistor sensed at a point between (i) the second switch and the second resistor and (ii) the circuit reference point; and
terminating operation of the converter including shutting off the converter when a difference between the voltages either exceeds a high threshold indicative of transformer core flux walking or deceeds a low threshold indicative of transformer core flux walking.

9. An assembly comprising:
a converter having a winding around a transformer core, first and second switches configured to alternately connect respective winding segments to an input power, and first and second resistors respectively connected in series with the switches, the first resistor being connected between the first switch and a circuit reference point and the second resistor being connected between the second switch and the circuit reference point; and
a controller including a first current sense amplifier having a first input connected between the first switch and the first resistor and a second input connected to the circuit reference point for the first current sense amplifier to receive and amplify a first voltage corresponding to current through the first resistor, the controller further including a second current sense amplifier having a third input connected between the second switch and the second resistor and a fourth input connected to the circuit reference point for the second current sense amplifier to receive and amplify a second voltage corresponding to current through the second resistor;
the controller further including an amplifier comparator configured to receive the voltages from the first and second sense amplifiers, compare the voltages, and generate an output indicative of a difference between the voltages;
wherein the controller is further configured to terminate operation of the converter including shutting off the converter when the difference between the voltages either exceeds a high threshold indicative of transformer core flux walking or deceeds a low threshold indicative of transformer core flux walking.

10. The assembly of claim 9 wherein:
the amplifier comparator is an integrating difference amplifier comparator.

11. The assembly of claim 9 wherein:
the controller further includes a comparator assembly configured to compare the output indicative of the difference between the voltages with the thresholds indicative of transformer core flux walking.

12. The assembly of claim 11 wherein:
the controller further includes a high comparator configured to compare the output indicative of the difference between the voltages with the high threshold indicative of transformer core flux walking and a low comparator configured to compare the output indicative of the difference between the voltages with the low threshold indicative of transformer core flux walking.

13. The assembly of claim 11 wherein:
the controller includes a reset assembly configured to terminate operation of the converter, the reset assembly is configured to be triggered to terminate operation of the converter upon the high comparator detecting the difference between the voltages exceeding the high threshold.

14. The assembly of claim 13 wherein:
the reset assembly is further configured to be triggered to terminate operation of the converter upon the low comparator detecting the difference between the voltages deceeding the low threshold.

* * * * *